United States Patent [19]

Pauwels

[11] 4,129,341
[45] Dec. 12, 1978

[54] MODULATOR VALVE ASSEMBLY FOR A FLUID BRAKING SYSTEM

[75] Inventor: Edward M. Pauwels, South Bend, Ind.

[73] Assignee: The Bendix Corporation, Southfield, Mich.

[21] Appl. No.: 781,914

[22] Filed: Mar. 28, 1977

[51] Int. Cl.² .............................................. B60T 13/18
[52] U.S. Cl. ..................................... 303/6 R; 303/10; 303/115
[58] Field of Search ..................... 303/2, 6 R, 10, 114, 303/115, 116, 119, 92

[56] References Cited

U.S. PATENT DOCUMENTS

| | | | |
|---|---|---|---|
| 3,856,364 | 12/1974 | Mangold | 303/92 |
| 3,904,250 | 9/1975 | Kondo | 303/115 |
| 3,910,648 | 10/1975 | Riesenberg | 303/10 |
| 3,918,768 | 11/1975 | Farr | 303/92 |
| 3,923,344 | 12/1975 | Jekigawa et al. | 303/92 |
| 3,975,061 | 8/1976 | Kondo et al. | 303/115 |

*Primary Examiner*—Edward R. Kazenske
*Attorney, Agent, or Firm*—Paul David Schoenle; Ken C. Decker

[57] ABSTRACT

An adaptive braking system includes a fluid pressure source, a brake booster communicating with the fluid pressure source, a modulator valve communicating separately with the brake booster and the fluid pressure source and a wheel cylinder communicating with the modulator valve for receiving pressurized fluid in order to effectuate braking for an associated wheel. The modulator valve provides for communication of pressurized fluid to the wheel cylinder to effectuate braking. When a skidding condition is imminent with the associated wheel, a control valve within the modulator valve operates to reduce the pressure in the wheel cylinder and a pressure sensitive valve opens communication between the fluid pressure source and the control valve so that the control valve communicates the fluid pressure source with the wheel cylinder upon termination of the imminent skidding condition. When a predetermined pressure is reached in the wheel cylinder, the pressure sensitive valve is responsive to close communication between the fluid pressure source and the wheel cylinder and to open communication between the brake booster and the wheel cylinder.

5 Claims, 2 Drawing Figures

MODULATOR VALVE ASSEMBLY FOR A FLUID BRAKING SYSTEM

BACKGROUND OF THE INVENTION

An adaptive braking system is responsive to an imminent skidding condition during braking to relieve the pressure within a wheel cylinder thereby avoiding a lockup of a wheel monitored by the system. When the imminent skidding condition is no longer present, a modulator valve within the system is actuated by a control unit to open communication between the wheel cylinder and a brake booster so that braking is repeated.

The modulator valve controls the fluid communication between the brake booster and the wheel cylinder so that the fluid pressure within the wheel cylinder is decreased when skidding is imminent and increased when the skidding condition is terminated as measured by an electronic control unit.

In a common fluid braking system wherein the same fluid flows from a pressure source to the wheel cylinder, it is desirable to control the fluid pressure level within the wheel cylinder when a skidding condition is imminent and when fluid pressure is communicated to the wheel cylinder after the imminent skidding condition. Such controlled fluid pressure within the wheel cylinder not only avoids pressure surges when fluid is recommunicated to the wheel cylinder after the latter is relieved of fluid pressure, but also provides an even resistance to brake pedal movement so that the operator feels constant resistance during braking regardless of the operation of the modulator valve.

SUMMARY OF THE INVENTION

The present invention relates to an adaptive braking system wherein pressure is transmitted from a fluid pressure source to a wheel cylinder to effectuate braking. The adaptive braking system provides for communication of a common fluid to a brake booster and a modulator valve independently of each other, even though the brake booster communicates with the modulator valve.

The modulator valve includes a pressure sensitive valve which normally opens communication between the brake booster and the wheel cylinder and a control valve which cooperates with an electronic control unit to open and close communication from the modulator valve to the wheel cylinder. The control valve also cooperates with the pressure sensitive valve such that when the control valve is in a first position the pressure sensitive valve opens communication through the modulator valve from the brake booster and when the control valve is in a second position the pressure sensitive valve opens communication through the modulator valve from the fluid pressure source. The modulator valve further includes a sensor which is responsive to the pressure to fluid communicated from the fluid pressure source to the modulator valve in order to activate a solenoid which cooperates with the electronic control unit to move the control valve from the first position to the second position. Consequently, if the fluid pressure generated by the fluid pressure source is below a predetermined value the control valve will not move to close communication to the wheel cylinder even though a skidding condition is imminent because the fluid pressure source is not generating enough pressure to effectuate a braking application after the imminent skidding condition ceases.

Moreover, when the control valve is moved from the second position to the first position, pressurized fluid is communicated from the fluid pressure source to the wheel cylinder via the modulator to restore pressure in the wheel cylinder until the pressure within the wheel cylinder reaches a predetermined value whereupon the pressure sensitive valve closes communication from the fluid pressure source to the wheel cylinder and opens communication to the latter from the brake booster.

It is an object of the present invention to provide an adaptive braking system for a common fluid braking system such that pressure surges within a wheel cylinder subsequent to pressure relief of the latter during an imminent skidding condition are eliminated.

A further object of the invention is to provide a modulator valve having a pressure sensitive valve which cooperates with a control valve such that the modulator valve provides for communication from either a brake booster or a fluid pressure source depending upon the skidding condition of the wheel associated with the wheel cylinder.

DETAILED DESCRIPTION

Figure 1:
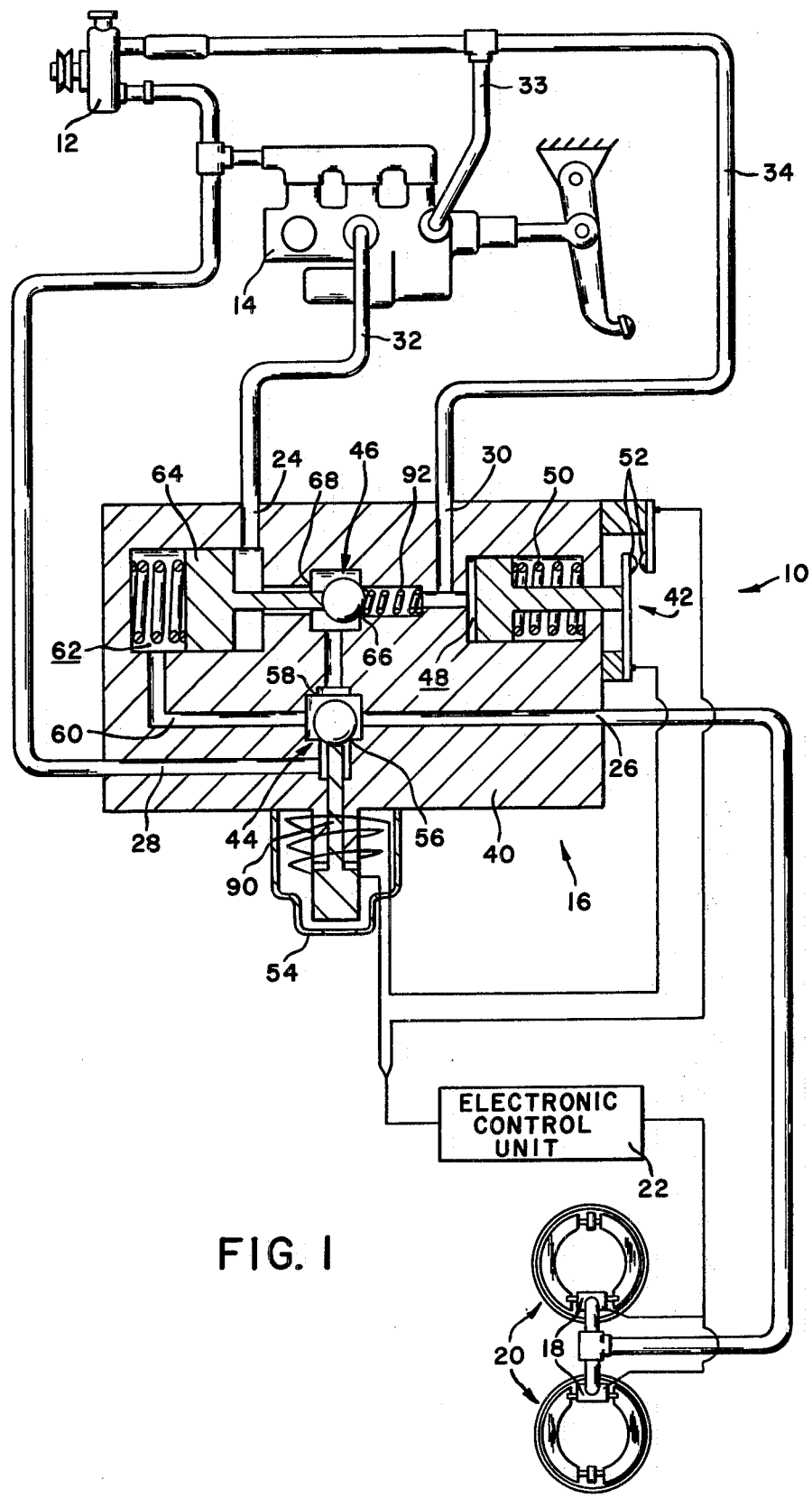
FIG. 1 is a schematic illustration of a common fluid braking system utilizing an adaptive braking system in accordance with the present invention.

Referring to FIG. 1, an adaptive braking system 10 includes a fluid pressure source 12, a brake booster 14, a modulator valve 16 and a wheel cylinder or hydraulic actuator 18. The fluid pressure source 12 generally comprises a power steering pump on a motor vehicle and the wheel cylinder 18 cooperates with a wheel 20 to effectuate braking during a braking application. As is well known, more than one wheel cylinder 18 can be provided to cooperate with a corresponding wheel. The electronic control unit 22 monitors the wheel speed of wheel 20 to provide an output signal when a skidding condition is imminent with wheel 20. The brake booster 14 is of the type illustrated in U.S. Pat. No. 3,907,375.

The modulator valve 16 includes an inlet port 24, an outlet port 26, a return port 28 and a secondary port 30. The inlet port 24 communicates the modulator valve 16 with the master brake cylinder 14. The outlet port 26 communicates the wheel cylinder 18 with the modulator valve 16 and the return port 28 communicates with a reservoir chamber in the fluid pressure source 12, while the secondary port 30 communicates with the fluid pressure source 12. Consequently, it is possible to communicate pressure to the modulator valve 16 via two independent passages, one of which communicates with the brake booster 14 by means of conduit 33 and the other passage communicates the fluid pressure source 12 with the secondary port 30 of the modulator valve 16 via conduit 34.

The modulator valve 16 comprises a housing 40 which supports or carries a sensor 42, a control valve 44 and a pressure sensitive valve 46. The sensor 42 is exposed to fluid pressure from the fluid pressure source 12 via conduit 34 and secondary port 30. If the pressure within chamber 48 is below a predetermined value the spring 50 urges the sensor 42 to the left viewing FIG. 1 to separate the points 52. Consequently, a solenoid 54 connected with the points is maintained in an off condition so that an output signal from the control unit 22 is not transmitted to the solenoid 54.

If the pressure of fluid within chamber 48 is above the predetermined value, the points 52 are connected so that an output signal from the electronic control unit 22 is transmitted to the solenoid 54. The solenoid 54 cooperates with the control valve 44 to move the latter from a first position engaging valve seat 56 to a second position engaging valve seat 58 when the electronic control unit generates an output signal and the points 52 are connected.

In the first position, the control valve 44 communicates the outlet port 26 with the inlet port 24 via the pressure sensitive valve 46. Moreover, the inlet port 24 is communicated through a bypass passage 60 with a chamber 62 when the control valve 44 is in the first position. The chamber 62 is defined by a piston 64 and the latter engages the pressure sensitive valve 46 such that pressure variations within the chamber 62 move the pressure sensitive valve 46 from a first position engaging valve seat 66 to a second position engaging valve seat 68. In the first position the pressure sensitive valve 46 opens communication between the inlet port 24 and the control valve 44 and in the second position the pressure sensitive valve 46 opens communication between the secondary port 30 and the control valve 44.

In the second position of the control valve 44 the outlet port 26 and the chamber 62 are communicated with the return port 28 so that the fluid pressure within the chamber 62 and the wheel cylinder 18 are relieved. Consequently, when the control valve 44 is in the first position, the pressure sensitive valve 46 is in the first position opening communication between the inlet port 24 and the control valve 44 and when the control valve 44 is in the second position opening communication between the chamber 62 and the return port 28 the pressure sensitive valve 46 is in the second position opening communication between the secondary port 30 and the control valve 44.

DESCRIPTION OF THE PREFERRED EMBODIMENT

Figure 2:
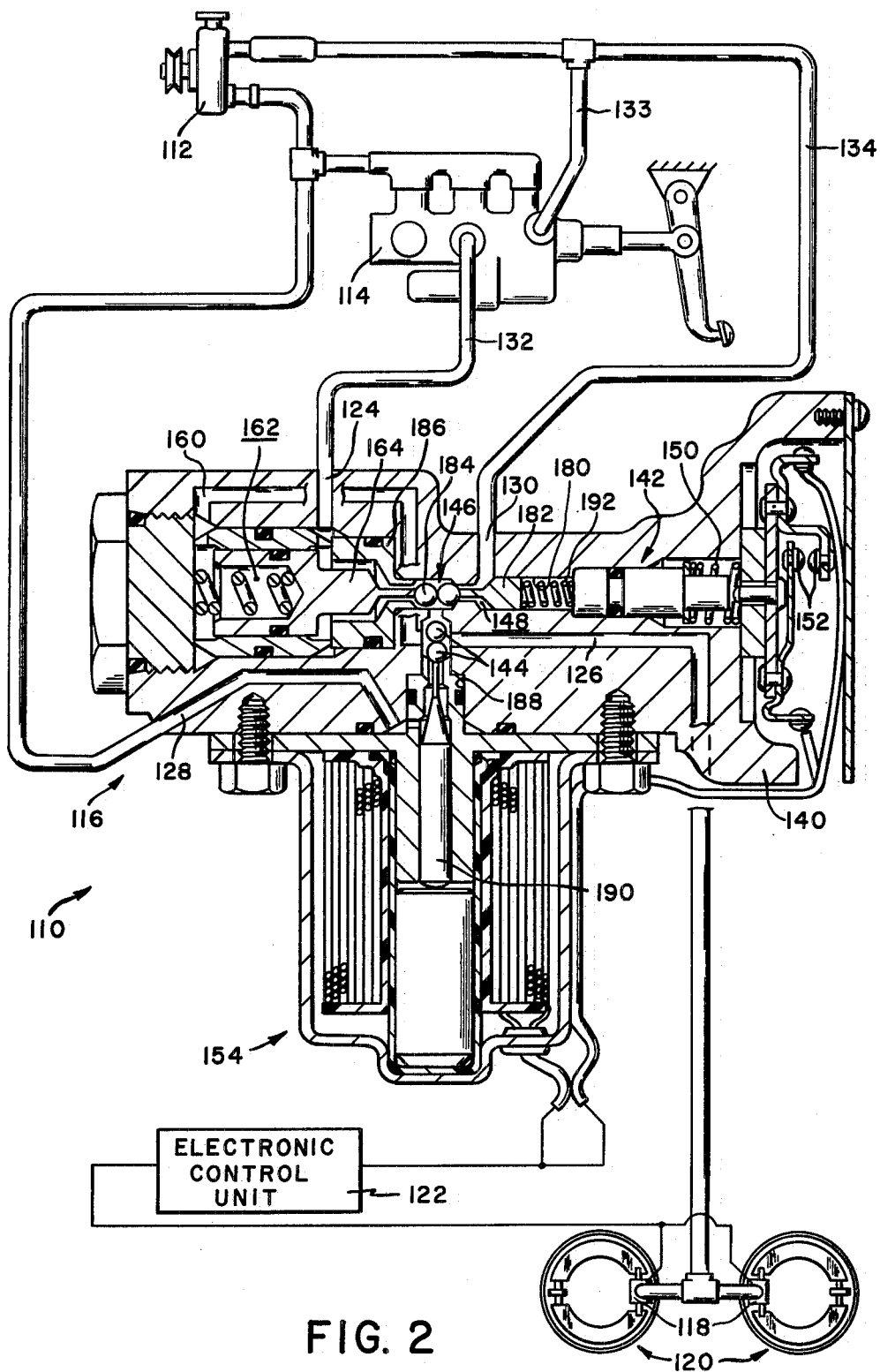
FIG. 2 is a cross-sectional view of the preferred embodiment for a modulator valve used in the system of FIG. 1.

Turning to FIG. 2 wherein reference numerals increased by 100 refer to similar parts from the adaptive braking system of FIG. 1, the adaptive braking system 110 of the preferred embodiment includes a fluid pressure source 112, a brake booster 114, a wheel cylinder 118 and a modulator valve 116. The modulator valve comprises a housing 140 having a longitudinal stepped bore 180 extending therethrough. The stepped bore 180 receives the sensor 142 and the pressure sensitive valve 146. The sensor 142 includes a plunger 182 which resiliently engages the pressure sensitive valve 146, when the fluid pressure within secondary port 130 is below the predetermined value, to urge the pressure sensitive valve 146 to its second position wherein one of the balls 184 of the pressure sensitive valve 146 seats against the sleeve 186 circumscribing the piston 164.

A cross bore 188 is stepped to receive the control valve 144 and a solenoid 154 operates to move the control valve within the cross bore 188. The cross bore intersects the longitudinal bore 180 at substantially the pressure sensitive valve 146 so that the latter can move across the intersection to communicate either the inlet port 124 or the secondary port 130 with the cross bore 188. Moreover, the secondary port 130 intersects the longitudinal bore 180 between the sensor 142 and the pressure sensitive valve 146 so that the former is always exposed to the fluid pressure within secondary port 130 to connect or disconnect the points 152.

Although not clearly shown in FIG. 2, it is noted that the bypass passage 160 communicates with the outlet port 126. This communication provides for the communication of chamber 162 and wheel cylinder 118 with the inlet port 124 when the control valve 144 is in the first position and with the return port 128 when the control valve 144 is in the second position.

MODE OF OPERATION

The adaptive braking system 110 is utilized in a motor vehicle to effectuate braking and compensate for skidding wherein the wheel 120 is sliding relative to a surface. The fluid pressure source 112 communicates pressurized fluid to the brake booster 114 via conduit 133 and to the modulator valve 116 via conduit 134.

When the brake pedal is depressed to effectuate a braking application, pressurized fluid from the brake booster 114 is communicated to the inlet port 124 of the modulator valve 116. With the control valve 144 in the first position the pressurized fluid flows past the pressure sensitive valve 146 to the control valve 144 and to the outlet port 126 and chamber 162. Pressurized fluid within chamber 162 maintains the pressure sensitive valve 146 in the first position so that pressurized fluid continues to flow to the outlet port 126 for communication with the wheel cylinder 118. The wheel cylinder responds to the pressurized fluid to effectuate braking.

If during braking the wheel 120 decelerates such that skidding is imminent, the electronic control unit 122 develops an outpt signal which energizes the solenoid 154. The energized solenoid moves the rod 190 and control valve 144 to the second position so that the pressurized fluid within chamber 162 and wheel cylinder 118 is communicated to the return port 128 to relieve the same. Consequently, the braking effect of the wheel cylinder 118 is reduced to prevent further deceleration of the wheel 120. Moreover, the relief provided for chamber 162 enables the piston 164 and pressure sensitive valve 146 to move to the second position due to the spring 192. Consequently, the control valve in the second position is presently exposed to pressurized fluid from the secondary port 130 and fluid pressure source 112.

As the relief of the wheel cylinder 118 provides for the termination of the deceleration of wheel 120, the electronic control unit 122 stops generating an output signal so that the solenoid 154 is de-energized. Consequently, the rod 190 and control valve 144 return to the first position. With the control valve 144 returned to the first position, the secondary port 130 and pressure source 112 are communicated to the chamber 162 and the wheel cylinder 118 to reapply braking. When the fluid pressure communicated from the fluid pressure source 112 to the chamber 162 and wheel cylinder 118 is sufficient to move the piston 164 and pressure sensitive valve 146 against spring 192 back to the first position, the secondary port 130 is closed to the wheel cylinder 118 and chamber 162, while the inlet port 124 and brake booster 114 are opened to the chamber 162 and wheel cylinder 118. As the fluid pressure within the chamber 162 and the wheel cylinder 118 has been increased to a predetermined level by the communication with the secondary port 130 and fluid pressure source 112 when the pressure sensitive valve was in the second position, the brake booster 114 and its corresponding brake pedal will be exposed to a pressurized chamber 162 and wheel cylinder 118 so that the brake pedal will not collapse upon a reapplication of braking subsequent to imminent skidding, when the control valve 144 returns to its first position followed by the pressure sensitive valve 146 returning to its first position.

In order to prevent the wheel cylinder 118 from being exposed or communicated with the fluid pressure source 112 when the latter is inoperative, the sensor 142 is exposed to the fluid pressure within the secondary port 130 to prevent the energization of the solenoid 154 if the pressure therein is below a predetermined level. The sensor 142 prevents energization of the solenoid 154 by disconnecting the electronic control unit 122 from the solenoid 154, as the spring 150 separates the points 152 when the pressure within the secondary port 130 is below the predetermined value.

Although the invention has been described in conjunction with a preferred embodiment, it is axiomatic that many alternatives, modifications, and variations are apparent to those skilled in the art. Accordingly, these alternatives, modifications, and variations are intended to fall within the scope of the present invention as measured by the appended claims.

I claim:

1. A modulator valve having an inlet port for fluid communication with a brake booster, an outlet port for fluid communication with a wheel cylinder, a secondary port for fluid communication with a pressure source, and a return port for fluid communication with a reservoir, said modulator valve comprising:
   a housing defining the inlet port, the outlet port, the secondary port, and the return port therein;
   a control valve cooperating with said housing in a first position to provide fluid communication between the inlet port and the outlet port, said control valve being movable to a second position closing fluid communication between said inlet port and said outlet port and providing fluid communication between the outlet port and the return port; and
   a pressure sensitive valve cooperating with said housing to provide fluid communication between the inlet port and said control valve when said control valve is in the first position, said pressure sensitive valve also cooperating with said control valve to close fluid communication between the inlet port and said control valve when the latter is in the second position, said pressure sensitive valve communicating with the secondary port and cooperating with said control valve to provide fluid communication between the secondary port and said control valve when the latter is in the second position and to provide fluid communication between the secondary port and the outlet port as said control valve is being moved from the second position to the first position.

2. A modulator valve having a housing defining an inlet for fluid communication with a brake booster, an outlet for fluid communication with a wheel cylinder, a return port for fluid communication with a reservoir and a secondary port for fluid communication with a pressure source, said modulator valve comprising:
   a control valve within said housing normally providing fluid communication between the inlet port and the outlet port in a first position, said control valve being movable to a second position closing fluid communication between the inlet port and the outlet port and providing fluid communication between the return port and the outlet port; and
   a pressure sensitive valve within said housing cooperating with said control valve when the latter is in the second position in order to prevent fluid communication between the inlet port and said control valve, said pressure sensitive valve and said control valve also cooperating when said control valve is moved to the first position to provide fluid communication between the secondary port and the wheel cylinder, said pressure sensitive valve providing fluid communication between the secondary port and the wheel cylinder until a predetermined pressure is reached in the wheel cylinder and said pressure sensitive valve being movable when the pressure within the wheel cylinder reaches the predetermined pressure to close the secondary port and open fluid communication between the inlet port and the wheel cylinder.

3. The modulator valve of claim 2 in which said housing includes a longitudinal bore and a cross bore intersecting the longitudinal bore substantially at said pressure sensitive valve and said control valve is disposed within the cross bore.

4. The modulator valve of claim 2 in which a solenoid cooperates with said control valve to move the latter to the second position and a sensor means is responsive to the pressure within the secondary port to permit actuation of said solenoid, said housing includes a longitudinal bore extending therethrough for receiving said pressure sensitive valve and said sensor means and the secondary port communicates with the longitudinal bore between said pressure sensitive valve and said sensor means.

5. The modulator valve of claim 4 in which said sensor means includes a plunger disposed between the secondary port and a contact means, said plunger being responsive to the pressure within the secondary port to resiliently bias said contact means to a position permitting actuation of said solenoid.

* * * * *